Patented Dec. 18, 1951

2,579,283

UNITED STATES PATENT OFFICE 2,579,283

PRODUCTION OF LYSINE MONOHYDROCHLORIDE

Sterling N. Vines, Niagara Falls, N. Y., assignor to E. I. du Pont de Nemours and Company, Wilmington, Del., a corporation of Delaware No Drawing. Application July 21, 1950, Serial No. 175,293

7 Claims. (Cl. 260—534)

This invention relates to the production of lysine monohydrochloride and more particularly to the recovery of lysine in the form of its monohydrochloride from aqueous hydrolysates.

Methods for the production of lysine have been described in Scott et al. U. S. P. 2,498,300 and in the pending application by Arthur O. Rogers, S. N. 758,985, filed July 3, 1947, now abandoned. In these methods a polymeric hydantoin (poly-3,5-tetramethylene hydantoin) or delta-aminobutyl hydantoin, respectively, is hydrolyzed to produce an aqueous solution of lysine. The hydrolysis may be effected by treatment with an aqueous alkaline solution and the resulting crude hydrolysis product is an alkaline aqueous solution of lysine containing considerable amounts of impurities. From such hydrolysates it is desired to remove the lysine in the form of lysine monohydrochloride and preferably in a pure crystalline form of the monohydrochloride.

Free lysine is a somewhat deliquescent, alkaline material which absorbs carbon dioxide and moisture from the air. Both the free lysine and its alkali metal salts are rather difficult to obtain in pure forms by crystallization from impure aqueous solutions such as the above hydrolysates. Lysine dihydrochloride is an acidic, deliquescent material, soluble in water, methanol and ethanol, and is difficult to obtain in a pure form by crystallization from aqueous or alcoholic solutions. Lysine monohydrochloride is soluble in water, substantially insoluble in alcohols and is easily crystallized in pure form from aqueous solutions. It is not deliquescent and does not absorb carbon dioxide. These properties make the monohydrochloride the preferred commercial form of lysine.

An object of the present invention is the recovery of lysine in the form of lysine monohydrochloride from an impure, alkaline, aqueous solution of lysine. Another object is to prepare a purified grade of lysine monohydrochloride from an impure, alkaline, aqueous solution of lysine. A further object is to convert lysine dihydrochloride into lysine monohydrochloride. Still other objects of the invention will be apparent from the following description.

The above objects are attained in accordance with the present invention by acidifying an impure, alkaline, aqueous solution of lysine to form an impure solution of lysine dihydrochloride, removing therefrom alkali metal chloride and passing the resulting crude solution of lysine dihydrochloride through an anion-exchange resin bed in basic form. The resulting effluent is a solution of lysine monohydrochloride, half of the HCl content of the lysine dihydrochloride being adsorbed on the anion-exchange resin. The resulting lysine monohydrochloride solution may be evaporated and then cooled to form lysine monohydrochloride crystals which may be separated by mechanical means. Preferably, the crude lysine monohydrochloride solution is treated with a solid decolorizing material such as finely divided charcoal, active carbon or the like, to adsorb coloring matters before crystallization of the lysine monohydrochloride therefrom.

The invention is further illustrated by the following example:

Example

An alkaline solution of lysine was prepared by hydrolyzing 134 parts by weight of a crude product containing poly - 3,5 - tetramethylene hydantoin with an aqueous solution consisting of 71 parts of sodium hydroxide dissolved in 213 parts by weight of water. This alkaline solution was acidified by mixing with 381 parts by weight of 37% hydrochloric acid. The poly-3,5-tetramethylene hydantoin was made by reacting 5-(delta-chlorobutyl)-hydantoin with sodium carbonate. The acidified solution was evaporated at atmospheric pressure until the temperature of the solution reached 118° C. at which time 401 parts by weight of water had been evaporated off, leaving a residue containing about 30% by weight of water. The residual solution was cooled to 70° C., 200 parts by weight of methanol was added and the mixture was stirred and refluxed for 30 minutes. The mixture then was cooled to 25° C. and filtered to remove precipitated salt. The salt filter cake was washed with anhydrous methanol until substantially colorless, the washings being added to the filtrate, 25 parts by weight of methanol being used to wash the salt crystals. The filtrate which was a concentrated solution of lysine dihydrochloride in methanol and water and containing impurities, was diluted by the addition of 200 parts by weight of water.

The diluted lysine dihydrochloride solution was passed through a bed of an acid-receptive amine type anion-exchange resin. The resin bed then was washed to remove adherent solution, the washings being added to the effluent from the bed. The first effluent through the anion-exchange resin bed had a pH of 7.4; the final effluent from the resin bed had a pH of 5.7.

The amine type anion-exchange resin was a granular material supplied by the Rohm and Haas Company under the trade name "Amberlite IR-4B" and was a phenol-tetraethylene pentamine-formaldehyde resin. Before using it to treat the lysine dihydrochloride solution, the resin was placed in an acid-receptive form by treating it in a conventional manner with an aqueous solution of sodium carbonate.

The effluent from the anion-exchange resin treatment, a solution of lysine monohydrochloride, was mixed with 15 parts by weight of a decolorizing carbon and the mixture was heated until about half of the water present in the solution had been evaporated off. The solution then was cooled to about 50° C. and the decolorizing carbon filtered off. The resulting clarified solution was then further evaporated until the temperature of the liquid in the evaporator reached 114° C. when boiling at 1 atmosphere pressure. The concentrated solution was mixed with 110 parts by weight of anhydrous methanol after cooling to 40° C. A small amount of lysine monohydrochloride crystals to serve as seed was added and the mixture was cooled and stirred at 10° C. until crystallization was complete. The resulting crystals were filtered off and washed with 20 parts of methanol in three washings. The crystals were removed from the filter and dried at a temperature of 70 to 80° C. and under a vacuum of 27 to 29 inches. 58.9 parts by weight of crystalline lysine monohydrochloride was obtained which represents a 64% yield based on the amount of chlorobutyl hydantoin used to make the polytetramethylene hydantoin hydrolyzed. Analysis of the product showed 14.92% nitrogen and 18.65% chlorine, representing a purity of 97.3% based on nitrogen content and 96% based on chloride content. The melting point of the product was 266 to 269° C. The ash content of the product was 0.05%.

The mother liquor from the crystallization of the lysine monohydrochloride contained impurities together with some uncrystallized lysine. The mother liquor was passed through a bed of a cation-exchange resin ("Dowex 50" supplied by the Dow Chemical Co.) which is a sulfonated polymerizate of a polyvinyl aryl compound and which had been preconditioned by conventional treatment first with hydrochloric acid and then with ammonium hydroxide solution. The lysine monohydrochloride was adsorbed by the resin, while impurities passed through with the effluent. After washing the resin bed thoroughly with pure water, the lysine monohydrochloride was recovered therefrom by passing through the bed a 10% solution of ammonium hydroxide until evaporation of a sample showed the effluent to be free from lysine. The lysine effluent was evaporated to remove the ammonia and then acidified by the addition of 37% hydrochloric acid to a pH of about 4.2 and was then evaporated down and cooled to crystallize out lysine monohydrochloride. This procedure yielded about 20 parts by weight of lysine monohydrochloride, which had a melting point of 271 to 274° C., a nitrogen content of 14.75% and a chlorine content of 18.63%.

The present invention may be employed to recover lysine in the form of the monohydrochloride from impure, alkaline lysine solutions obtained by hydrolyzing delta-aminobutyl hydantoin or polymeric tetramethylene hydantoin and said solutions will contain a salt of the lysine, for example, the sodium salt, depending upon the alkali used for the hydrolysis. Sufficient hydrochloric acid is added to the alkaline solution to neutralize it and to convert the lysine to lysine dihydrochloride. The amount of hydrochloric acid required will depend upon the free alkalinity of the solution and the amount of the lysine salt present. An excess of hydrochloric acid causes no serious difficulties in the succeeding operations. Preferably, I use an excess of a concentrated (30 to 37%) hydrochloric acid, e. g., 5 to 20% excess, over that required to convert all the lysine to lysine dihydrochloride and to convert the alkali metal compounds present to the chlorides.

The salt (metal chloride) resulting from acidification is removed from the lysine dihydrochloride solution by adding a salt precipitant and filtering. The salt precipitant is a water-miscible organic liquid which is a good solvent for lysine dihydrochloride and a non-solvent or a poor solvent for the salt, for example, ethanol or methanol. Preferably, methanol is used for this purpose. If desired, the salt may be precipitated by merely adding sufficient methanol to the solution, but it is preferable to first remove most of the water (e. g., 80 to 100% by weight) by evaporation and then to complete precipitation of the salt by adding sufficient methanol or ethanol to keep the lysine dihydrochloride in solution. The precipitation and filtration to remove the salt may be carried out at around room temperature, e. g., 15 to 30° C., or if desired, at higher temperatures below the boiling point of the salt precipitant.

In a preferred mode of operation, the acidified lysine solution is heated to boiling to evaporate off water until the atmospheric boiling point of the solution has risen to about 115 to 120° C., while continuously stirring the mixture. I prefer to remove as much water as possible without thickening the mixture to the point where it cannot be effectively stirred; and the maximum amount of water removed accordingly will depend on the stirring equipment employed. Generally, evaporation is continued until the water content of the mass is reduced to 40% by weight or less. If desired, evaporation may be continued to substantially complete dehydration by employing conventional vacuum distillation methods. The removal of water in this stage of the process contributes to a lowered ash content of the final product. By substantially complete dehydration, a substantially ash-free lysine monohydrochloride may be obtained.

After evaporation of water, the mixture is cooled to near the boiling point of methanol or lower; and methanol is added in amount at least sufficient to completely dissolve the lysine dihydrochloride, e. g., an amount equal to about 50 to 75% by weight of the mixture. The mixture is refluxed and stirred for a sufficient time to insure complete mixing and attainment of equilibrium conditions, e. g., 20 to 60 minutes, after which it is cooled to 15 to 30° C. The precipitated salt is removed by filtration and the filter cake is washed with anhydrous methanol. The filtrate (lysine dihydrochloride solution) preferably then is suitably diluted before treatment with the anion-exchange resin by adding water, for example, in amount equal to 50 to 150% by weight of the methanol used for precipitation of the salt. The amount of water added should at least be sufficient to dissolve all of the lysine monohydrochloride formed by the anion-exchange resin treatment, as the monohydrochloride is insoluble in methanol.

The precipitated alkali metal salt, such as sodium chloride, preferably is removed by filtration; and to obtain a high yield of lysine it is preferred to wash the precipitated salt on the filter with anhydrous methanol or other solvent for the lysine dihydrochloride which is a non-solvent for the salt. The washings may be added to the filtrate.

After the removal of the salt, the remaining liquid is lysine dihydrochloride dissolved in a mixture of water and the salt precipitant, e. g., methanol. This solution, preferably after dilution as described above, is contacted with an amine type anion-exchange resin which adsorbs half of the combined hydrochloric acid together with any excess, free acid, thus converting the lysine dihydrochloride into lysine monohydrochloride, which remains in solution. The solution may be contacted with the anion-exchange resin in any conventional fashion, for example, by stirring the solution with a quantity of the resin followed by decantation or filtration or by passing the solution through a bed of the resin. The resulting liquid is a solution of the lysine monohydrochloride. Before contacting it with the anion-exchange resin, the solution is diluted with sufficient water so that the solution contains at least 0.5 part by weight (preferably 0.5 to 1.5 parts) of water for each part of methanol present.

Before use, the anion-exchange resin should be treated with an alkaline material, for example, caustic soda, ammonia, sodium carbonate or the like, to place it in an acid-receptive condition. Any conventional method for placing the anion-exchange resin in an acid-receptive condition may be employed. The treatment of the dihydrochloride solution with the anion-exchange resin may be controlled by pH measurement. Prior to contact with the resin the solution will have a pH of about 2. When the lysine dihydrochloride has been completely converted to the monohydrochloride, the pH will be around 4 or higher.

Anion-exchange resins suitable for converting lysine dihydrochloride to the monohydrochloride in accordance with this invention are those of the known "amine type," i. e., resins made by polymerization or condensation reactions of amines and containing amino groups. Such resins may be made, for example, by reacting together a phenol, an aliphatic polyamine and formaldehyde or by condensation of a ketone, a phenol and a polyamine. Examples of commercial amine type anion-exchange resins which may be employed are: "Amberlite IR-4B," a phenol-tetraethylene pentamine - formaldehyde polymer manufactured by Rohm and Haas Co.; "De-acidite," an acetone-tetraethylene pentamine-formaldehyde condensation product, manufactured by the Permutit Co.; "Duolite A-1," "Duolite A-2" and other "Duolite A" resins, which are phenol/formaldehyde resins after-treated with tetraethylene pentamine; and "Liquonex AF," a polyalkylene polyamine resin manufactured by the Liquid Conditioning Corp.

It is essential that an amine type resin be used, as other types, including the quaternary ammonium types of anion-exchange resins, convert the lysine dihydrochloride substantially to free lysine; whereas the amine type resins, used as herein described, produce the desired lysine monohydrochloride. It has been found that no particular control is needed to make this conversion, as the amine type anion-exchange resins readily remove substantially one mole of HCl from the lysine dihydrochloride to produce the monohydrochloride and not more than about 10% of free lysine, despite any further extended treatment.

The lysine monohydrochloride may be separated from its solution by conventional crystallization methods. Preferably, the solution is heated to evaporate sufficient water to cause crystallization of the lysine monohydrochloride on cooling to around room temperature or lower. The monohydrochloride may be crystallized from a methanol-free aqueous solution or from a methanol-water mixture, as may be desired. Generally, the best yields are obtained by crystallizing from methanol-water mixtures (e. g., containing 2 to 5 parts by weight of methanol for each part of water), while products of the highest purity are obtained by crystallization from solutions containing little or no methanol. Other water-miscible organic solvents may be used in place of methanol, e. g., ethanol or acetone as crystallization solvent, if desired. The monohydrochloride solution preferably should have a pH of 4.1 to 4.3 during the crystallization; and if necessary, hydrochloric acid may be added before crystallization occurs to adjust the pH to that value.

In order to produce purified lysine monohydrochloride having little or no discoloration, the solution may be treated prior to crystallization with a suitable solid material capable of adsorbing colored impurities, for example, the various known grades of decolorizing carbons, fuller's earth or the like. Decolorization is accomplished in a conventional manner, for example, merely by heating and stirring the decolorizing material with the lysine hydrochloride solution, followed by filtration. The decolorizing treatment may be applied at any stage in the process wherein the solution consists of either lysine dihydrochloride or lysine monohydrochloride. If desired, the decolorizing material may be applied to the lysine dihydrochloride solution prior to the filtration of the alkali metal salt, or prior to crystallization of the lysine monohydrochloride, or both. Preferably, decolorizing carbon is added to the lysine monohydrochloride solution, and the latter is heated to evaporate off part of the water. The solution is then filtered to obtain a clarified, concentrated solution of the monohydrochloride. The pH of the solution then may be measured, and if too high adjusted to pH 4.1 to 4.3 by adding concentrated hydrochloric acid. The solution then may be further evaporated to crystallize the product.

A large part of the impurities originally present in the crude lysine solution are found in the mother liquor from the lysine monohydrochloride crystallization step, which liquor also contains a considerable quantity of lysine monohydrochloride. Lysine may be recovered therefrom in more or less pure form by conventional methods, including recrystallization. A preferred method comprises contacting the mother liquor with a cation-exchange resin in ammonium form which adsorbs the lysine, the impurities passing through in the effluent. The adsorbed lysine then may be recovered from the resin by elution with ammonium hydroxide solution, the resulting effluent is heated to drive off ammonia, acidified with hydrochloric acid to a pH of 4.1 to 4.3 and evaporated down to crystallize out lysine monohydrochloride. Or, if desired, the lysine elutriate may be added to a crude lysine solution (e. g., hydrolysate) or to a crude lysine dihydrochloride solution, which is to be treated as described herein above.

I claim:

1. The process for converting lysine dihydrochloride to lysine monohydrochloride which comprises contacting a solution of the dihydrochloride with a phenol-tetraethylene pentamine-formaldehyde anion-exchange resin, said resin being employed in its basic form.

2. The process which comprises passing an aqueous solution of lysine dihydrochloride through a bed of a phenol-tetraethylene pentamine-formaldehyde anion-exchange resin, said resin being employed in its basic form, and recovering lysine monohydrochloride from the resulting effluent.

3. The process for producing lysine monohydrochloride from an impure, alkaline, aqueous solution of lysine which comprises acidifying said solution with hydrochloric acid, removing therefrom alkali metal chloride, passing the remaining lysine dihydrochloride in aqueous solution through a bed of a phenol-tetraethylene pentamine-formaldehyde anion-exchange resin, said resin being employed in its basic form, and crystallizing lysine monohydrochloride from the effluent from said resin bed.

4. The process according to claim 3, wherein said alkali metal chloride is removed by adding to the acidified solution a liquid which is a solvent for lysine dihydrochloride but a non-solvent for the alkali metal hydrochloride and removing the resulting alkali metal precipitate from the solution.

5. The process for recovering lysine monohydrochloride from an impure, alkaline, aqueous solution of lysine which comprises acidifying said solution with hydrochloric acid, evaporating said solution until it contains not more than about 40% by weight of water, adding sufficient methanol to precipitate the resulting chloride of the alkali and to retain the lysine dihydrochloride in solution, removing the precipitated chloride, passing the remaining lysine dihydrochloride in aqueous solution through a bed of a phenol-tetraethylene pentamine-formaldehyde anion-exchange resin, said resin being employed in its basic form, and crystallizing lysine monohydrochloride from the effluent from said resin bed.

6. The process according to claim 5 wherein said effluent from the resin bed is decolorized by treatment with a solid color-adsorbent and the pH of said effluent is maintained at pH 4.1 to 4.3 during the crystallization of lysine hydrochloride therefrom.

7. The process for recovering lysine monohydrochloride from an impure, alkaline, aqueous solution of lysine which comprises acidifying said solution with sufficient concentrated hydrochloric acid to form lysine dihydrochloride, evaporating the acidified solution until it contains not more than about 40% by weight of water, adding sufficient methanol to completely dissolve the lysine dihydrochloride present, filtering to remove precipitated alkali metal chloride, diluting the filtrate with an amount of water equal to about 50 to 150% by weight of the methanol present, passing the diluted solution through a bed of a phenol-tetraethylene pentamine-formaldehyde anion-exchange resin, said resin being employed in its basic form, heating the effluent from said resin bed with a decolorizing carbon, filtering off the carbon, and crystallizing lysine monohydrochloride from the resulting solution at a pH of 4.1 to 4.3.

STERLING N. VINES.

REFERENCES CITED

The following references are of record in the file of this patent:

UNITED STATES PATENTS

| Number | Name | Date |
|---|---|---|
| 2,341,907 | Cheetham et al. | Feb. 15, 1944 |
| 2,457,117 | Bernardi | Dec. 28, 1948 |
| 2,480,654 | Howe et al. | Aug. 30, 1949 |
| 2,498,300 | Scott et al. | Feb. 21, 1950 |

OTHER REFERENCES

Buc et al., J. Am. Chem. Soc., vol. 67, p. 93 (1945).

Dunn et al., "Advances in Protein Chemistry," edited by Anson et al., (Academic Press), vol. III, p. 317 (1948).